United States Patent [19]

Kantor

[11] 4,456,026
[45] Jun. 26, 1984

[54] CONTROL DEVICE PARTICULARLY USEFUL AS MANUAL SLIDE VALVE

[75] Inventor: Itzhak Kantor, Menashe, Israel

[73] Assignee: Plasson Maagan Michael Industries Ltd., Menashe, Israel

[21] Appl. No.: 431,190

[22] Filed: Sep. 30, 1982

[30] Foreign Application Priority Data

Jul. 8, 1982 [IL] Israel .................................. 66276

[51] Int. Cl.³ .......................... F16K 43/00; F16K 3/16
[52] U.S. Cl. ..................................... 137/315; 251/327; 251/329; 251/367
[58] Field of Search ............................ 137/315, 454.2; 251/326, 327, 329, 366, 367

[56] References Cited

U.S. PATENT DOCUMENTS

| | | | |
|---|---|---|---|
| 1,037,338 | 9/1912 | Scott | 251/327 |
| 1,838,656 | 12/1931 | Bullock | 251/327 |
| 2,780,232 | 2/1957 | Ney | 251/329 |
| 3,358,961 | 12/1967 | Montgomery et al. | 251/329 |
| 3,371,906 | 3/1968 | Lubold | 137/315 |
| 4,089,506 | 5/1978 | Blake | 251/327 |
| 4,111,395 | 9/1978 | Sheppard | 251/367 |

Primary Examiner—George L. Walton
Attorney, Agent, or Firm—Benjamin J. Barish

[57] ABSTRACT

A manual slide valve comprises a housing having a valve slide slidable within the housing. The housing is constituted of two sections each including projections and recesses cooperable with each other and with the slide valve such that when the slide valve is disposed within the housing, the housing sections are interlocked with it and with each other against separation, and when the slide valve is removed from the housing, the housing sections are free and may be separated from each other. The control device may also be embodied in an electrical switch wherein the slide member is the movable electrical contact.

11 Claims, 3 Drawing Figures

U.S. Patent    Jun. 26, 1984    4,456,026
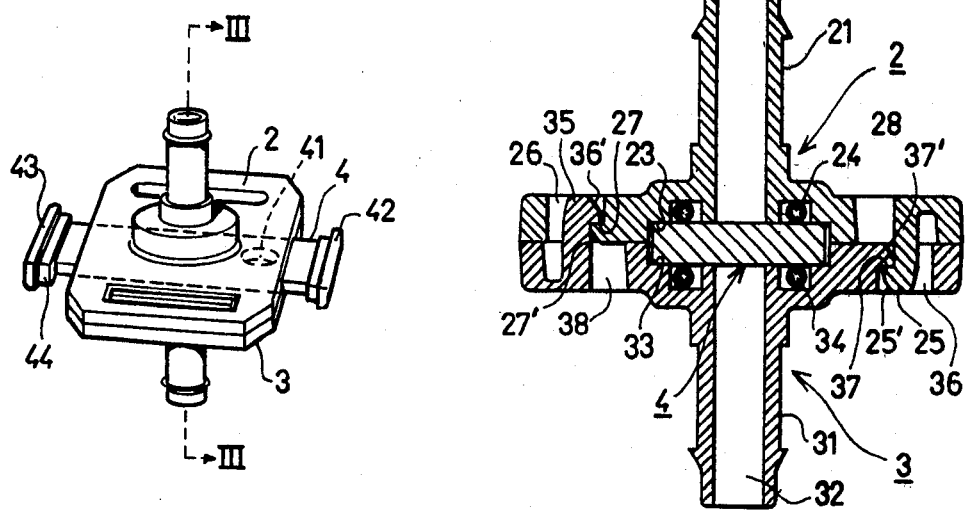
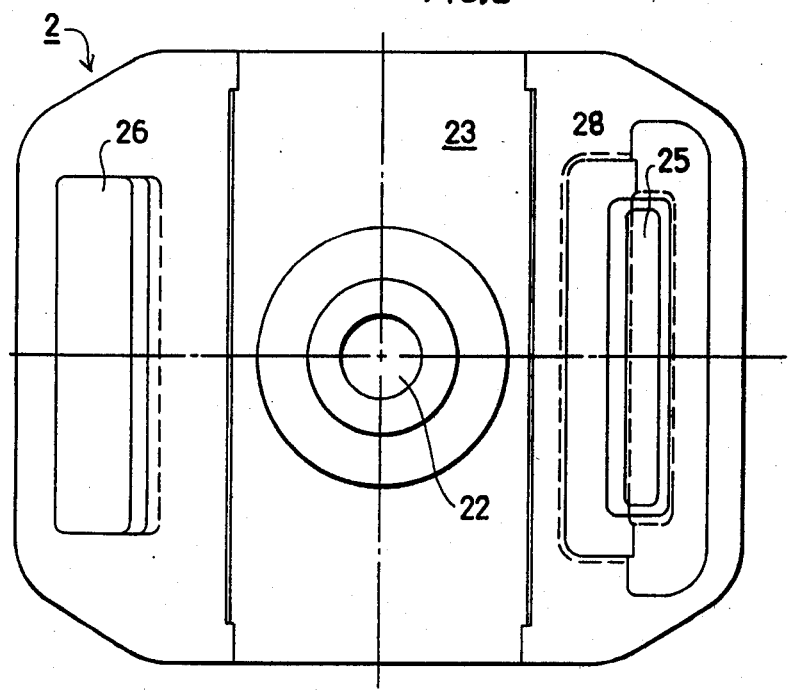

4,456,026

CONTROL DEVICE PARTICULARLY USEFUL AS MANUAL SLIDE VALVE

BACKGROUND OF THE INVENTION

The present invention relates to control devices, such as valves or switches. The invention is particularly useful in a manual slide valve, and is therefore described below with respect to this application, but it will be appreciated that the invention could advantageously be used in other applications as well.

Manual slide valves are commonly used for turning-on or turning-off the flow of a fluid, such as water, by manually moving a slide serving as a valve operator. Such manual slide valves have a large number of applications, and many different designs are presently in use.

An object of the present invention is to provide a control device, and particularly a manual slide valve, of a novel structure which includes a few very simple parts, and which therefore can be produced and assembled in volume and at low cost.

SUMMARY OF THE INVENTION

According to a broad aspect of the present invention, there is provided a control device including a housing and a displaceable control member movable within the housing, characterized in that said housing is constituted of two sections each being formed with interlocking elements, including a projection projecting from one side of the displaceable member and a depression formed in the opposite side of the displaceable member. The projection of one section is co-operable with the depression of the other section and with said displaceable control member such that when the latter member is disposed within the housing, said housing sections are interlocked with it and with each other against separation, and when the displaceable control member is removed from said housing, said housing sections may be separated from each other.

More particularly, each of said housing sections includes a recess formed in one face thereof, a hook projecting from said one face at one side of the recess, and an opening extending through the section at the opposite side of the recess; the recess, hook and opening in each section being located such that the two sections may be assembled together with the hook of one section passing through the opening in the other section, and with the recesses of the two sections aligned to form a channel for receiving said displaceable control member; said recesses, hooks, and openings being dimensioned such that said displaceable control member in said aligned recesses locates the hook and opening of one section in interlocking relationship with respect to those of the other section, but the removal of said displaceable member from said aligned recesses permits one section to move laterally with respect to, and thereby to be separated from, the other.

In the preferred embodiment of the invention described below, the two housing sections are of like construction, such that the hook of one section is receivable through the opening of the other like section in interlocking relationship with respect thereto when the displaceable member is within the aligned recesses of the two sections. In addition, the outer face of the hooks, and the inner edge of the recesses, are tapered in a complementary manner, such that the two housing sections may be assembled by disposing them in overlying relationship and with said displaceable member in said aligned recesses, and then snap-fitting them into said interlocking relationship.

It will thus be seen that such a control device consists of but three elements, two of which (i.e., the two housing sections) are of identical construction and therefore may be produced by the same mold. It will also be seen that such a control device may be assembled in a quick and simple manner by snap-fitting them into the interlocking relationship.

The invention is particularly useful when embodied in a fluid-flow control valve, wherein the displaceable member is movable either to a valve-open or to a valve-closed position, each of said housing sections being formed with a passageway communicating with its respective recess for conducting a fluid thereto; said displaceable member being formed with an opening therethrough, which opening is aligned with the passageways in the two housing sections in the valve-open position of the displaceable member, and is non-aligned with the passageways of the two sections in the valve-closed position of the displaceable member. When embodied in this application, the recess in each of said two housing sections is circumscribed by a sealing ring engageable with the respective face of said displaceable member; also, each of the two housing sections is also formed, on its face opposite to that of its recess, with a connector for connection to a fluid conduit.

The invention, however, could advantageously be embodied in other applications, for example, in electrical switches wherein the displaceable member is a movable switch operator including a contactor adapted to bridge fixed contacts carried by the two housing sections.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a three-dimensional view illustrating one form of fluid-flow control valve constructed in accordance with the invention;

FIG. 2 is a top plan view illustrating the construction of one of the two housing sections included in the valve of FIG. 1; and FIG. 3 is a sectional view along lines III—III of the complete valve illustrated in FIG. 1.

DESCRIPTION OF A PREFERRED EMBODIMENT

The fluid-flow control valve illustrated in the drawings is constituted of three main parts, namely two housing sections 2 and 3, and a displaceable member 4 receivable between the two housing sections and serving as a valve operator. Member 4 may be moved either to a valve-open or to a valve-closed position, the latter position being illustrated in FIG. 1.

The two housing sections 2 and 3 are of identical construction and may actually be made by the same mold, which is one of the advantages of the present invention. Another advantage, as indicated earlier, is that the three parts may be quickly assembled by snap-fitting them into an interlocking relationship, as will be described more particularly below.

The structure of each housing section 2, 3 is best seen in FIGS. 2 and 3. Thus, each housing section is of generally square configuration with cut-off corners (see FIG. 1). Each section is formed, on its outer face, with a tubular connector 21, 31 for connection to a fluid conduit (not shown), each connector including a passageway 22, 32 extending to a recess 23, 33, formed on the inner face of the housing section. Each recess is formed in a central area of the inner face of the respective housing section and is of a width substantially equal to that of the valve operator 4. The depth of each recess 23, 33 is approximately one-half the thickness of the valve operator 4, so that when the two housing sections 2, 3 are joined together with the two recesses 23, 33 aligned as shown in FIG. 3, the two recesses form a channel for receiving valve operator 4.

The inner face of each housing section 2, 3 is further formed with an annular recess surrounding its central passageway 22, 32, which annular recess is occupied by a sealing ring 24, 34.

Each housing section 2, 3 is further formed with a projection in the form of a hook 25, 35 projecting from the inner face of the housing section at one side of its recess 23, 33, and with a depression in the form of an opening 26, 36 formed through the housing section at the opposite side of its recess 23, 33. Hook 25 of housing section 2 is adapted to be received within opening 36 in housing section 3, and hook 35 of housing section 3 is adapted to be received in opening 26 in housing section 2, for interlocking the two housing sections together with the valve operator 4 disposed between them as shown in FIG. 3. For this purpose, openings 26 and 36 in the two housing sections are elongated in the direction of their respective central recess 23, 33, as shown particularly in FIG. 2; and their projecting hooks 25 and 35 are correspondingly elongated. In addition, the inner edge of each of the rectangular openings is formed with a recessed ledge, as shown at 27 and 37 respectively, for engagement with the flat underface of the projecting hook 25, 35. The inner face of each ledge is tapered, as shown at 27', 37', and likewise the outer face of the respective projecting hook 25, 35, is also correspondingly tapered, as shown at 25', 35'. This arrangement permits the projecting hooks 25, 35 of the two housing sections to be snap-fitted into their respective openings 26, 36 and to be seated in their respective ledges 27, 37.

In addition, the inner side of each projecting hook 25, 35, is bordered by further rectangular openings 28, 38 to increase the flexibility of their projecting hooks.

The displaceable valve operator 4 is in the form of a strip of substantially the same width as the recesses 23, 33 in the two housing sections 2, 3, and, as indicated earlier, of a thickness about one-half the depth of each recess, so that when the two housing sections are assembled together (FIG. 3) they define a channel for the slidable movement of the valve operator. Valve operator 4 is formed with an opening, shown in broken lines at 41 in FIG. 1, and with a finger piece 42, 43 at each of its opposite ends, one finger piece, e.g. 43, being attachable by a friction sleeve 44. In the valve-closed position (illustrated in FIG. 1) opening 41 is out of alignment with the two passageways 22 and 32 extending through the two housing sections 2 and 3, respectively, but is in alignment with these two passageways in the valve-open position, opening the valve to the flow of the fluid from the conduits connected to the connectors 21, 31 of the two housing sections 2, 3.

The manner of assembling and disassembling the valve will be apparent from the above description. Thus, the two like housing sections 2, 3 are placed in overlying relationship with the valve operator 4 disposed within the recesses 23, 33 and with the projecting hook 25, 35 of one housing section received within the opening 26, 36 of the other housing section. A simple squeezing pressure is then applied to the two housing sections, whereupon the tapered surfaces 25', 35' of the respective hooks 25, 35, cooperable with the tapered surfaces 27', 37' bordering the respective openings 26, 36, produce a snap-fitting action between the hooks and the openings, causing the two sections to be assembled in interlocking relationship with the movable valve operator 4 between them. The sealing rings 34, 34, circumscribing the openings 22, 32, assure that no fluid will leak out through the housing or will flow from one connector 21, 31 to the other, unless the valve operator 4 is moved to the valve-open position with its opening 41 in alignment with the two passageways 22, 32 of the two housing sections.

Whenever it is desired to disassemble the housing, e.g. for cleaning or repair purposes, it is only necessary to remove finger piece 43 from one end of the valve operator 4, this being permitted by the friction-attachment of this finger piece to the end of the valve operator 4 by sleeve 44. When finger piece 43 is thus removed, the valve operator may be slid outwardly to remove it from the two housing sections 2, 3, whereupon one of the housing sections may be moved laterally with respect to the other to cause the hook (25 or 35) of one to disengage from the ledge (27 or 37) adjacent to the opening (26, 36) of the other and thereby to permit the two sections to be separated.

While the invention has been described with respect to one preferred embodiment, namely a control valve including a slidable valve operator, it will be appreciated that it could advantageously be used in other applications. An example of another such application is an electrical switch including a slidable operator carrying an electrical contactor which is adapted to bridge fixed electrical contacts carried by the housing sections. Many other variations, modifications and applications of the invention will be apparent.

What is claimed is:

1. A control device including a housing and displaceable control member movable within the housing, characterized in that said housing is constituted of two sections each being formed with interlocking elements including a projection projecting from one side of the displaceable member and a depression formed in the opposite side of the displaceable member, the projection of one section being co-operable with the depression of the other section, and with said displaceable control member, such that when the latter member is disposed within the housing, said housing sections are interlocked with it and with each other against separation, and when the displaceable control member is removed from said housing, said housing sections may be separated from each other.

2. The device according to claim 1, wherein each of said housing sections includes a recess formed in one face thereof for the displaceable member, and wherein said interlocking elements include a hook projecting from said one face at one side of the recess, and an opening extending through the section at the opposite side of the recess; the recess, hook and opening in each section being located such that the two sections may be assembled together with the hook of one section passing through the opening in the other section, and with the recesses of the two sections aligned to form a channel for receiving said displaceable control member; said recesses, hooks and openings being dimensioned such that said displaceable control member in said aligned recesses locates the hook and opening of one section in interlocking relationship with respect to those of the other section, but the removal of said displaceable member from said aligned recesses permits one section to move laterally with respect to, and thereby to be separated from, the other.

3. The device according to claim 2, wherein said two housing sections are of like construction, such that the hook of one section is receivable through the opening of the other like section in interlocking relationship with respect thereto when the displaceable member is within the aligned recesses of the two sections.

4. The device according to claim 2, wherein said opening in each of the two housing sections is of rectangular configuration, and has a recessed ledge along the inner edge thereof, each of said hooks also being of elongated configuration and having an inwardly-extending projection overlying the recessed ledge of the rectangular opening of the other section when the displaceable member is within the aligned recesses of the two sections.

5. The device according to claim 4, wherein said displaceable member is a slide of substantially the same width as said aligned recesses of the two housing sections.

6. The device according to claim 5, wherein each housing section is formed with a second opening therethrough bordering the inner side of the hooks in the respective section.

7. The device according to claim 2, wherein the outer face of the hooks, and the inner edge of the recesses, are tapered in a complementary manner, such that the two housing sections may be assembled by disposing them in overlying relationship and with said displaceable member in said aligned recesses, and then snap-fitting them into said interlocking relationship.

8. The device according to claim 2, in the form of a fluid-flow control valve, wherein said displaceable member is movable either to a valve-open or to a valve-closed position, each of said housing sections being formed with a passageway communicating with its respective recess for conducting a fluid thereto; said displaceable member being formed with an opening therethrough, which opening is aligned with the passageways in the two housing sections in the valve-open position of the displaceable member, and is non-aligned with the passageways of the two sections in the valve-closed position of the displaceable member.

9. The control valve according to claim 8, wherein the recess in each of said two housing sections is circumscribed by a sealing ring engageable with the respective face of said displaceable member.

10. The control valve according to claim 8, wherein each of said two housing sections is also formed, on its face opposite to that of its recess, with a connector for connection to a fluid conduit.

11. The control device according to claim 1, wherein said displaceable member includes a finger piece at one or both ends engageable by the user for displacing same.

* * * * *